(12) United States Patent
McGinn et al.

(10) Patent No.: US 10,801,569 B2
(45) Date of Patent: Oct. 13, 2020

(54) DISC BRAKE

(71) Applicant: Meritor Heavy Vehicle Braking Systems (UK) Limited, Cwmbran, Gwent (GB)

(72) Inventors: Matthew McGinn, Gwent (GB); Neel Shah, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 52 days.

(21) Appl. No.: 16/203,023

(22) Filed: Nov. 28, 2018

(65) Prior Publication Data

US 2019/0162259 A1    May 30, 2019

(30) Foreign Application Priority Data

Nov. 29, 2017  (EP) ..................................... 17204464

(51) Int. Cl.
*F16D 65/095*    (2006.01)
*F16D 55/226*    (2006.01)
(Continued)

(52) U.S. Cl.
CPC ......... *F16D 65/095* (2013.01); *F16D 55/226* (2013.01); *F16D 55/2255* (2013.01); *F16D 55/2265* (2013.01); *F16D 65/0043* (2013.01); *F16D 65/0068* (2013.01); *F16D 65/092* (2013.01); *F16D 2055/0008* (2013.01); *F16D 2055/0016* (2013.01); *F16D 2055/0037* (2013.01); *F16D 2250/0084* (2013.01)

(58) Field of Classification Search
CPC ............... F16D 55/226; F16D 55/2262; F16D 2121/08; F16D 2121/14; F16D 2125/08; F16D 2125/26; F16D 2125/32

USPC ........... 188/73.31, 73.32, 73.38, 73.39, 72.1, 188/250 D, 250 E, 250 R, 251 R
See application file for complete search history.

(56) References Cited

U.S. PATENT DOCUMENTS 3,920,104 A * 11/1975 Hoffmann ........... F16D 55/2262
188/73.31
3,924,711 A * 12/1975 Hoffmann ........... F16D 55/2262
188/73.43
(Continued)

FOREIGN PATENT DOCUMENTS

EP    0752541 A1    1/1997
EP    0853736 B1    5/2002
(Continued)

OTHER PUBLICATIONS

European Patent Office, Extended European Search Report for Application Serial No. EP17204464.6-1012, dated May 30, 2018.

*Primary Examiner* — Robert A. Siconolfi
*Assistant Examiner* — San M Aung
(74) *Attorney, Agent, or Firm* — Brooks Kushman PC

(57) ABSTRACT

A disc brake having an arrangement to prevent or inhibit fitting of first and second brake pads individually or in combination with friction material facing away from the rotor. A first formation of a first brake pad interacts with a corresponding first formation of a brake actuation mechanism for the first brake pad to be fitted in the first mounting structure. A second formation of the second brake pad interacts with a corresponding second formation of a carrier for the second brake pad to be fitted in the second mounting structure.

22 Claims, 8 Drawing Sheets

(51) Int. Cl.
<table>
<tr><td>F16D 55/2255</td><td>(2006.01)</td></tr>
<tr><td>F16D 65/00</td><td>(2006.01)</td></tr>
<tr><td>F16D 55/2265</td><td>(2006.01)</td></tr>
<tr><td>F16D 55/00</td><td>(2006.01)</td></tr>
<tr><td>F16D 65/092</td><td>(2006.01)</td></tr>
</table>

(56) References Cited

U.S. PATENT DOCUMENTS

<table>
<tr><td>4,560,035 A *</td><td>12/1985</td><td>Watanabe</td><td>F16D 65/095<br>188/71.1</td></tr>
<tr><td>8,960,381 B2</td><td>2/2015</td><td>Plantan et al.</td><td></td></tr>
<tr><td>2005/0284710 A1*</td><td>12/2005</td><td>Roberts</td><td>F16D 65/092<br>188/73.1</td></tr>
<tr><td>2007/0209891 A1*</td><td>9/2007</td><td>Stensson</td><td>F16D 65/0979<br>188/247</td></tr>
<tr><td>2007/0267256 A1*</td><td>11/2007</td><td>Blatt</td><td>F16D 55/22<br>188/73.31</td></tr>
<tr><td>2010/0147639 A1*</td><td>6/2010</td><td>Roberts</td><td>F16D 55/2265<br>188/242</td></tr>
<tr><td>2011/0000752 A1*</td><td>1/2011</td><td>Jandl</td><td>F16D 65/095<br>188/261</td></tr>
<tr><td>2014/0000991 A1*</td><td>1/2014</td><td>Bull</td><td>F16D 55/226<br>188/72.1</td></tr>
</table>

FOREIGN PATENT DOCUMENTS

<table>
<tr><td>EP</td><td>1473481 A1</td><td>11/2004</td></tr>
<tr><td>EP</td><td>1610025 A1</td><td>12/2005</td></tr>
<tr><td>EP</td><td>2682631 A1</td><td>1/2014</td></tr>
<tr><td>EP</td><td>3184389 A1 *</td><td>6/2017</td></tr>
</table>

* cited by examiner

DISC BRAKE

TECHNICAL FIELD

The present invention relates to a disc brake. More particularly, but not exclusively, the present invention relates to an air actuated disc brake incorporating an arrangement for ensuring that brake pads are always fitted in their correct orientation.

BACKGROUND

It is known from EP0752541 (ArvinMeritor, Inc) to provide formations on a pair of brake pads and corresponding features in abutment surfaces of a brake carrier to inhibit the brake being fully assembled with the pads orientated with the backplate thereof facing the brake disc. Incorrectly fitting brake pads in this manner is highly undesirable since the braking effectiveness of the brake is dramatically diminished and damage to the pad and brake disc may also occur.

In this patent, the two pads are identical and are provided with a formation that has rotational symmetry about an axis extending perpendicular to the rotational axis of the brake disc, so that although the pads cannot be fitted with the backplate facing the disc, the pads are interchangeable in an inboard and outboard sense.

In most applications such an arrangement is entirely satisfactory. However, the inventors have recognized that in some circumstances further measures may be required to ensure that in an "abuse" situation a user cannot forcibly refit the pad retainer. This situation may arise because the vertical height difference between the stepped pad abutments required to lift an incorrectly orientated pad is limited by the strength requirements of the brake carrier. This is compounded by the stepped abutments being located at the ends of the opening whereas the pad retainer is located at the center, so a height differential at an end results in approximately half the height differential at the center, making it harder to avoid abuse.

EP1473481 (BPW) discloses alternative pad foolproofing arrangements. In one embodiment, lugs having rotational, but not mirror symmetry are provided in a nonmachined portion of the pad windows, proximate the machined surfaces. This location is undesirable as it is a high stress area of the carrier, and may result in taper wear of the pad, as one of the two pistons exerts the same braking force, but over a lower pad area.

EP2682631 (Meritor) discloses a foolproofing arrangement where formations are located on inboard and outboard carrier beams, to help prevent brake pads from being incorrectly fitted with friction material facing the rotor.

The present invention seeks to overcome or at least mitigate the problems of the prior art.

SUMMARY

A disc brake is provided comprising: an actuation mechanism comprising a tappet, the tappet comprising a first formation; a disc brake rotor arranged to rotate about an axis; first and second brake pad mounting structures to be located in use adjacent opposing inboard and outboard faces respectively of the brake rotor, the second mounting structure comprising a second formation; first and second brake pads located by the first and second mounting structures respectively such that upon application of the actuation mechanism the pads clamp the rotor and brake torque is reacted by the pad mounting structures. The first brake pad has a corresponding first formation for interacting with the first formation of the tappet, and the second brake pad has a corresponding second formation for interacting with the second formation of the second mounting structure, The first and second formations do not have mirror symmetry about a plane defined by the center of the rotor, a radial axis R, and a circumferential direction C normal to both a rotational axis of the rotor A-A and radial axis R. To prevent or inhibit fitting of the first and second brake pads individually or in combination with friction material facing away from the rotor, the first formation of the first brake pad must interact with the corresponding first formation for the first brake pad to be fitted in the first mounting structure, and the second formation of the second brake pad must interact with the corresponding second formation for the second brake pad to be fitted in the second mounting structure.

The interaction of the first and second formations with the corresponding first and second formations of the first and second brake pads helps to prevent the brake pads being installed with the friction material facing away from the rotor as, if the corresponding formations cannot interact, then it is not possible to fit the brake pads in the first and second mounting structures. Having the first formation on the tappet itself keeps manufacturing costs low, as strict tolerances are not necessary for the first formation of the tappet or the first formation of the first brake pad. This is because the first brake pad will always be in engagement with the tappet, so there is no need to account for relative movement of the components in use, and so any slight errors in casting will not affect function of the brake and foolproofing of the brake pads.

The tappet may comprise a piston and a spreader plate, the first formation being located on the spreader plate. The piston and spreader plate may be integrally and monolithically formed from the same piece of material.

This can further simplify manufacture of the tappet and reduce the weight of the brake.

The first formation of the tappet may be a first projection extending in an axially outboard direction from the tappet. The second formation of the second mounting structure may be a second projection. The first corresponding formation of the first brake pad may be a first corresponding recess for locating the first projection of the tappet. The second corresponding formation of the second brake pad may be a second corresponding recess for locating the second projection of the second mounting structure.

During installation of the pads, if the first and second recesses do not align with the first and second projections, then it will not be possible to fit the brake pads into the mounting structures. Therefore, this helps to prevent the pads being installed with the friction material facing away from the rotor. Advantageously, because the first projection is on the tappet, there is no need to machine the outboard face of the first projection, as no precisely controlled clearance between the first projection and brake rotor is necessary; what is most critical is the relative distance between the tappet and the first brake pad, which will remain constant throughout the life of the brake.

The tappet may have an axially outboard surface for engaging the first brake pad. The first projection may be located adjacent a radially inner edge of this surface.

This enables the first brake pad to be simply "dropped in" in a radial direction while the tappet and rotor remain in place, during assembly of the brake and replacement of the first and second brake pads.

The first projection may extend radially less than 25 percent of the height of the brake pad.

This further helps to ensure a large area of the tappet surface can engage the brake pad and helps to minimize the amount of friction material that must be sacrificed to create the corresponding first recess on the first brake pad.

The first projection may have a width in the circumferential direction and may taper in a radial direction such that the widest point is adjacent the radially inner edge of the outboard tappet and the narrowest point is remote from the radially inner edge.

The tapered projection acts as a guide and makes it easier for a fitter to locate the first brake pad when it is installed in a radial direction.

The first projection may extend in the axially outboard direction to a distance such that, when the first brake pad is in place, the first projection does not extend further than a distance defined by a combination of a backplate of the pad and an amount of friction material equal to that of a fully worn pad. The first projection may not extend beyond the backplate of the first pad.

This helps to prevent contact of the projection with the rotor, as the friction material of the first brake pad is worn down.

The first formation may be located closer to the circumferential center of the tappet than the circumferential edge of the tappet. The first formation may pass through the axial centerline of the brake.

This helps to ensure backwards compatibility of the first and second brake pads, i.e., they can be used with older dual or single tappet brakes.

The first mounting structure may be a brake carrier. The first brake pad may locate on the circumferential carrier abutments. There may be an air gap between the circumferential carrier abutments.

A brake carrier with an air gap between the inboard circumferential abutments is cheap to manufacture and is light, e.g., compared to a carrier with an inboard beam. However, as the tappet has a first formation and the first brake pad has a corresponding first formation, the first brake pad can advantageously still be foolproofed.

The first mounting structure may be the spreader plate.

The disc brake may have a single tappet actuation mechanism. The second mounting structure may be carrier abutments located on an outboard beam of the carrier. The outboard beam may bow in an outboard direction. The second formation may be a projection that extends axially inboard such that it is substantially level with the carrier abutments.

This helps to ensure that the second brake pad can't be fitted in between the second projection and the rotor.

The second mounting structure may be carrier abutments located on an outboard portion of the caliper.

This enables manufacture of the carrier to be simplified, reducing cost.

The first and second formations may not have rotational symmetry about an axis extending radially from a central position between the first and second mounting structures.

This further foolproofs the brake pads, to help prevent the first and second brake pads being installed in the wrong position in the inboard/outboard sense.

The disc brake may further comprise an aperture for the fitting and removal of the brake pads in a radial direction. The aperture may permit the fitting and removal of the brake pads to be achieved with the brake rotor being in place. The first and second brake pads may be configured to be retained radially in the mounting structures by a pad retainer. The pad retainer may be prevented from being secured over the brake pads if at least one of the first and second brake pads is incorrectly orientated.

Enabling the pads to be installed radially is much easier for brake assembly. The prevention of the pad retainer being secured makes it easy for the installer of the brake pads to know when the brake pads are not installed properly, as the brake cannot be fully assembled, i.e., the retainer cannot be secured. This increases the safety of the brake.

BRIEF DESCRIPTION OF THE DRAWINGS

Embodiments of the invention will now be described with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
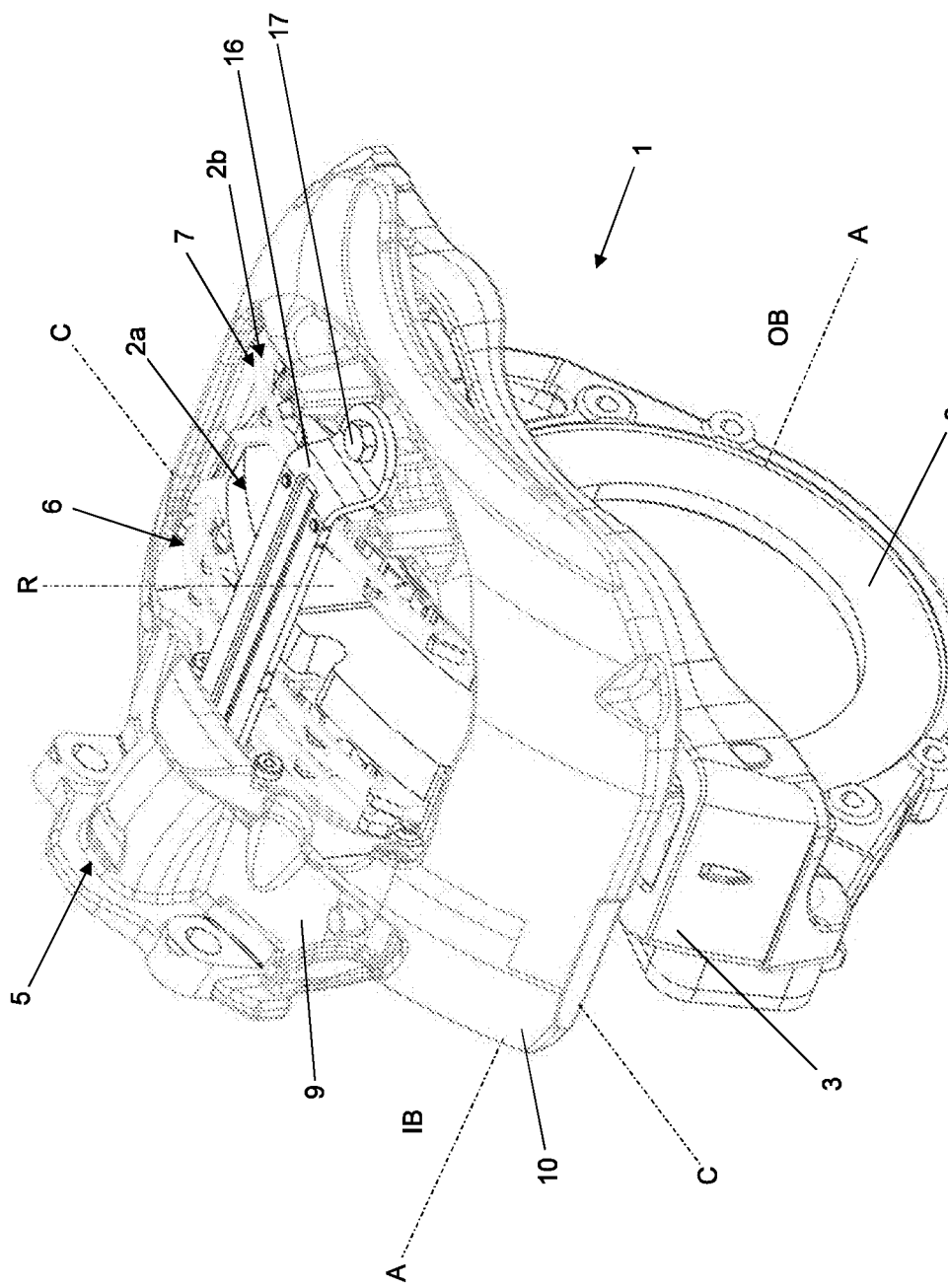
FIG. 1 is an isometric view of an air-actuated disc brake.
Figure 2:
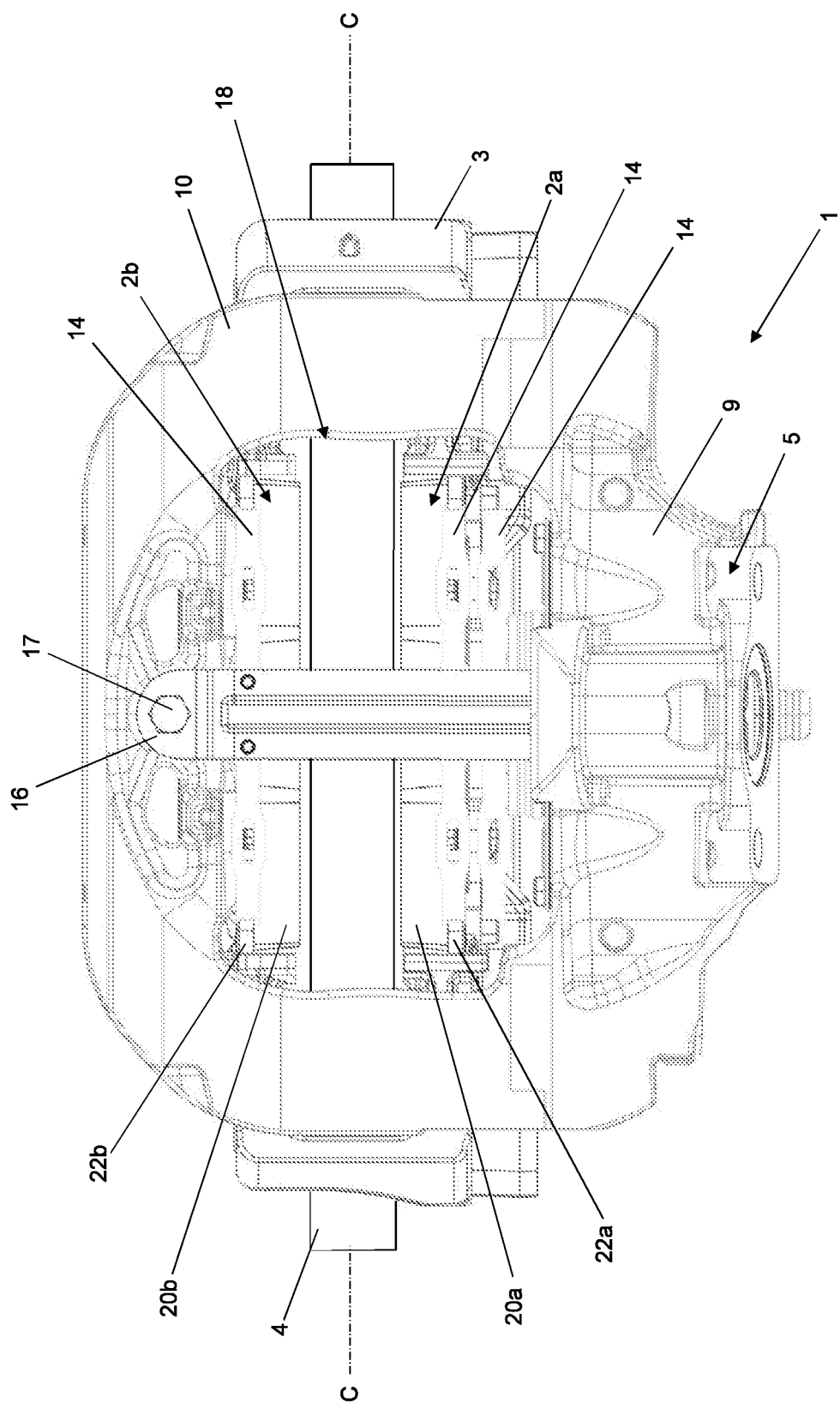
FIG. 2 is a plan view of the brake of FIG. 1.

With reference to FIGS. 1 and 2, a disc brake 1 is shown. In this embodiment, the disc brake 1 is a disc brake incorporating an actuating mechanism comprising a single tappet suitable for a commercial vehicle. This type of brake is intended to be air-actuated and is particularly, but not exclusively, suitable for lighter duty heavy vehicles, for example smaller trucks, or a trailer of a tractor-trailer combination.

Various orientations of the disc brake are described. In particular the directions inboard and outboard refer to the typical orientation of the disc brake when fitted to a vehicle. In this orientation the brake pad closest to the center of the vehicle is the pad directly actuated by an actuation mechanism and being the inboard pad, and the outboard pad being one mounted to a bridge portion of the caliper. Thus, inboard can be equated with an actuating side of the disc brake, and outboard with a reaction side. The terms radial, circumferential, tangential and chordal describe orientations with respect to the brake rotor. The terms vertical and horizontal describe orientations with the disc brake mounted uppermost on an axle, whereas it will be appreciated that in use such a disc brake may adopt any axle orientation depending upon packaging requirements of the vehicle.

The brake 1 includes a carrier 3 which is fixed to a torque plate 8. The torque plate 8 is fixed to an axle or steering knuckle (not shown) of a vehicle in use. The brake has first and second brake pad mounting structures in the form of "windows" or radial openings 6, 7 for receiving identical inboard and outboard brake pads 2a, 2b.

Figure 3:
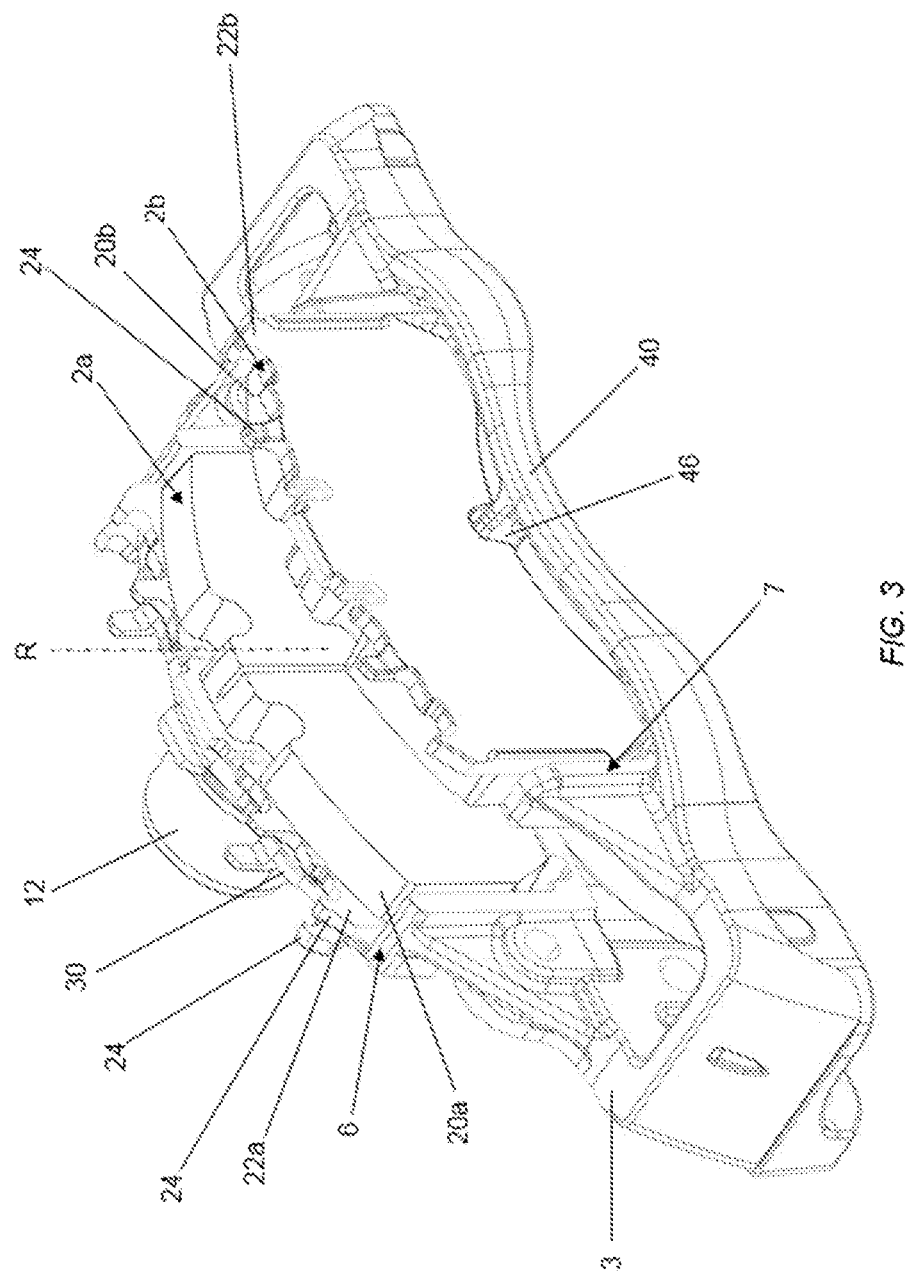
FIG. 3 is an isometric view from the outboard direction of a carrier, piston, and spreader plate, with brake pads in place, of the brake of FIG. 1.
Figure 4:
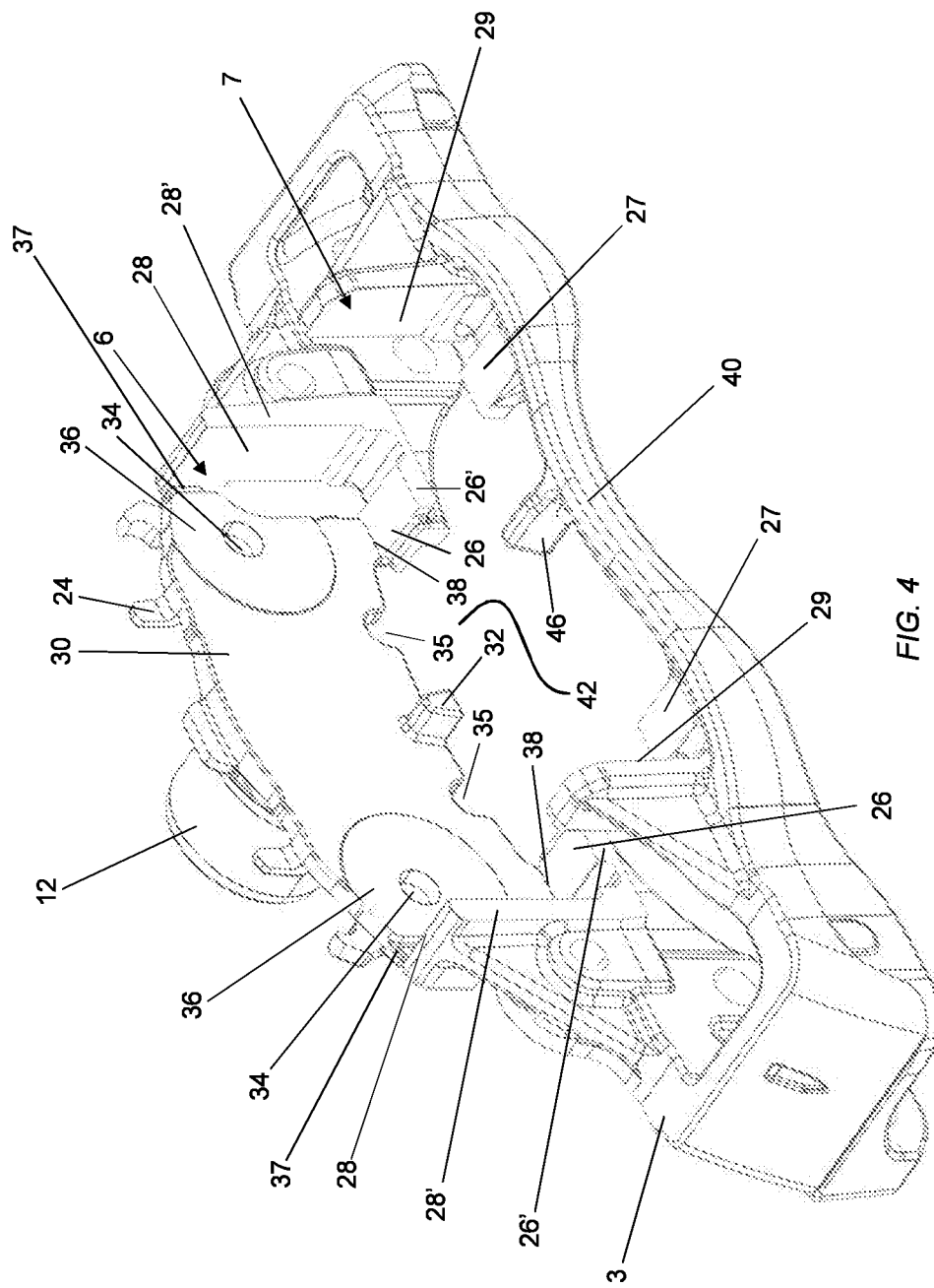
FIG. 4 is an isometric view from the outboard direction of a carrier, piston, and spreader plate, with no brake pads in place, of the brake of FIG. 1.

As can be seen most clearly from FIGS. 3 and 4, in this embodiment, the inboard and outboard openings 6, 7 are located in the carrier 3. The carrier 3 straddles a brake disc or rotor 4 mounted for rotation about an axis A-A with a wheel to be braked (not shown). The outboard direction is indicated by OB and inboard by IB. Arrow R indicates a radial axis extending through the center of the rotor 4 parallel to a direction for removal or installation of inboard and outboard brake pads 2a, 2b. Arrow C indicates a circumferential direction normal to both axis A-A and axis R.

The brake further comprises a caliper 10 slideably mounted on the carrier 3 for movement along axis A-A. The caliper 10 also straddles the rotor 4 and applies a clamp load to apply the brake and slow rotation of the wheel.

Figure 5:
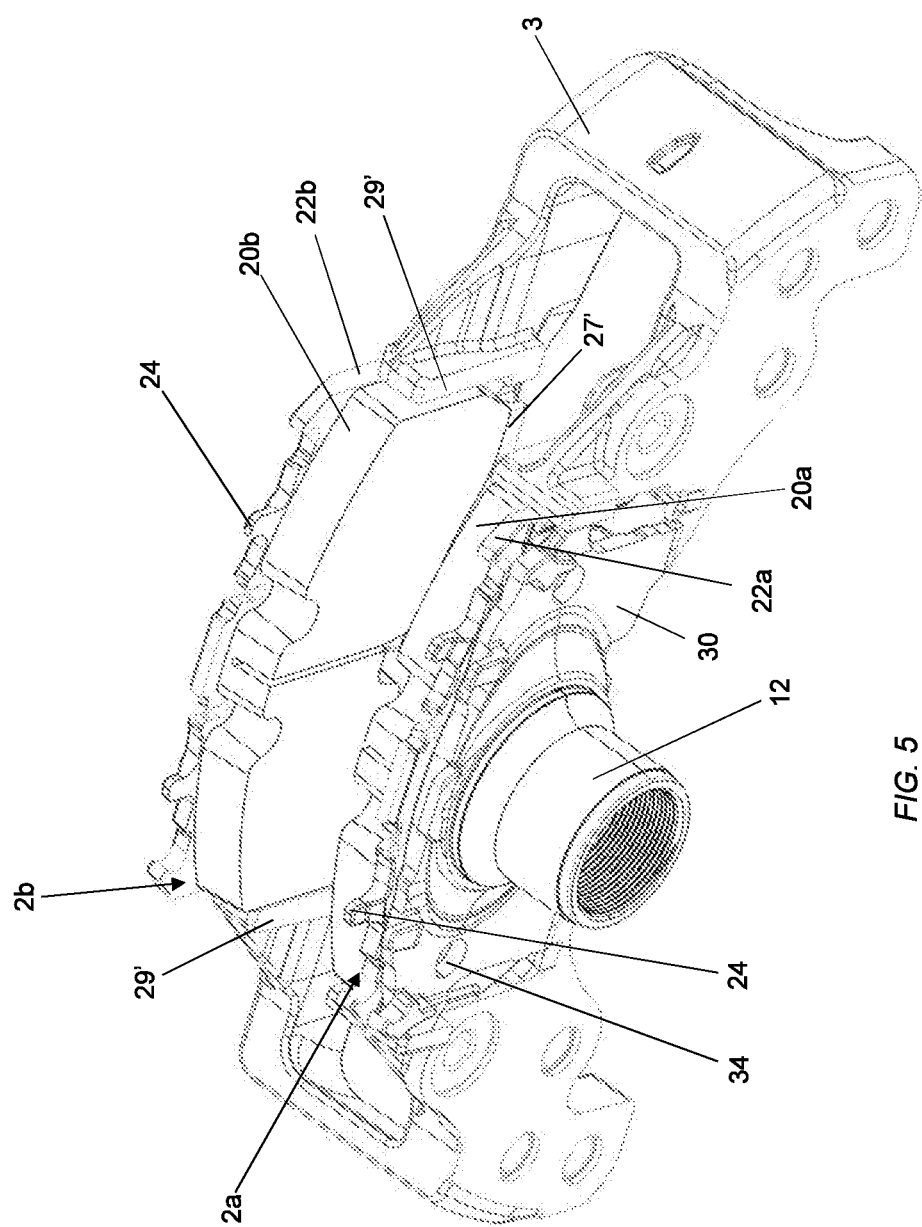
FIG. 5 is an isometric view from the inboard direction of a carrier, piston, and spreader plate, with brake pads in place, of the brake of FIG. 1.
Figure 6:
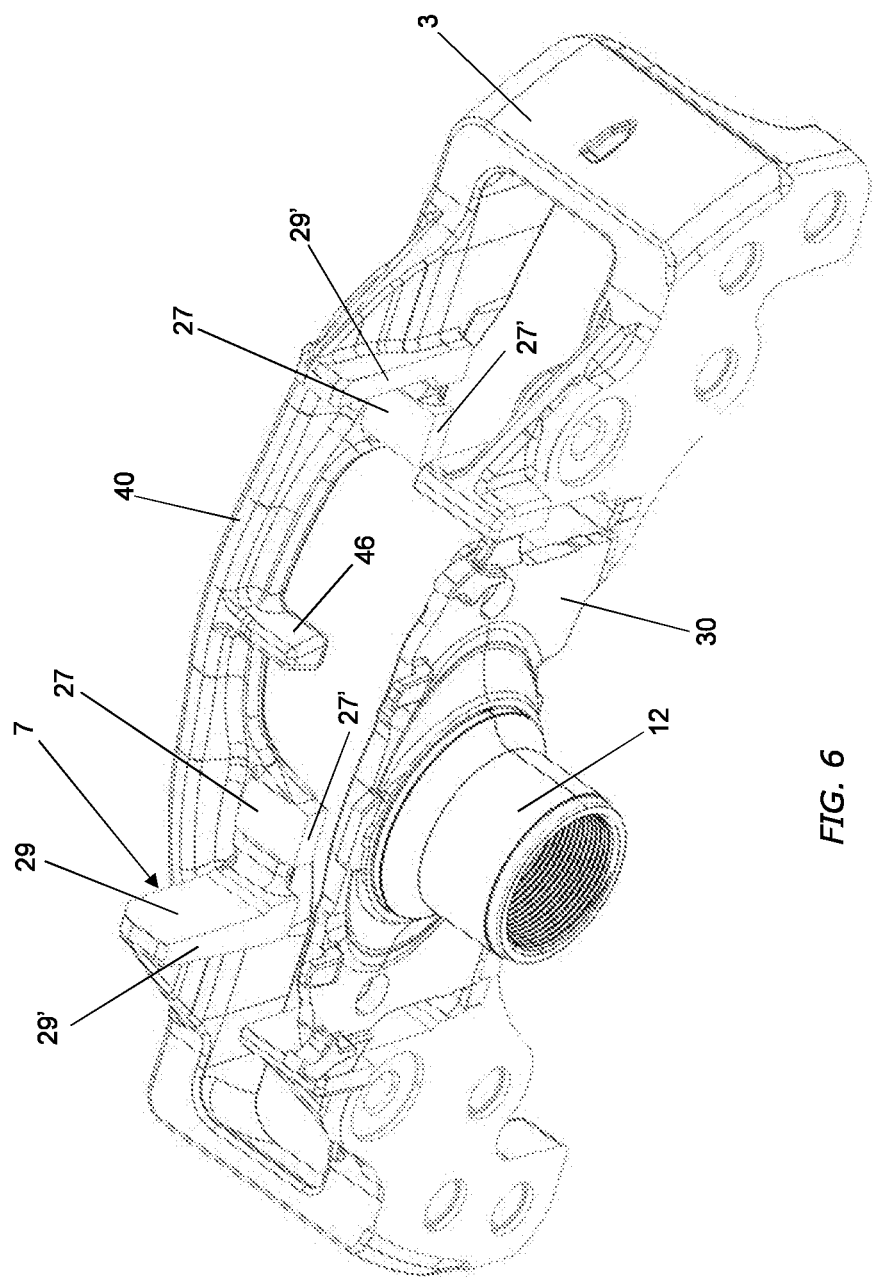
FIG. 6 is an isometric view from the inboard direction of a carrier, piston, and spreader plate, with no brake pads in place, of the brake of FIG. 1.
Figure 7:
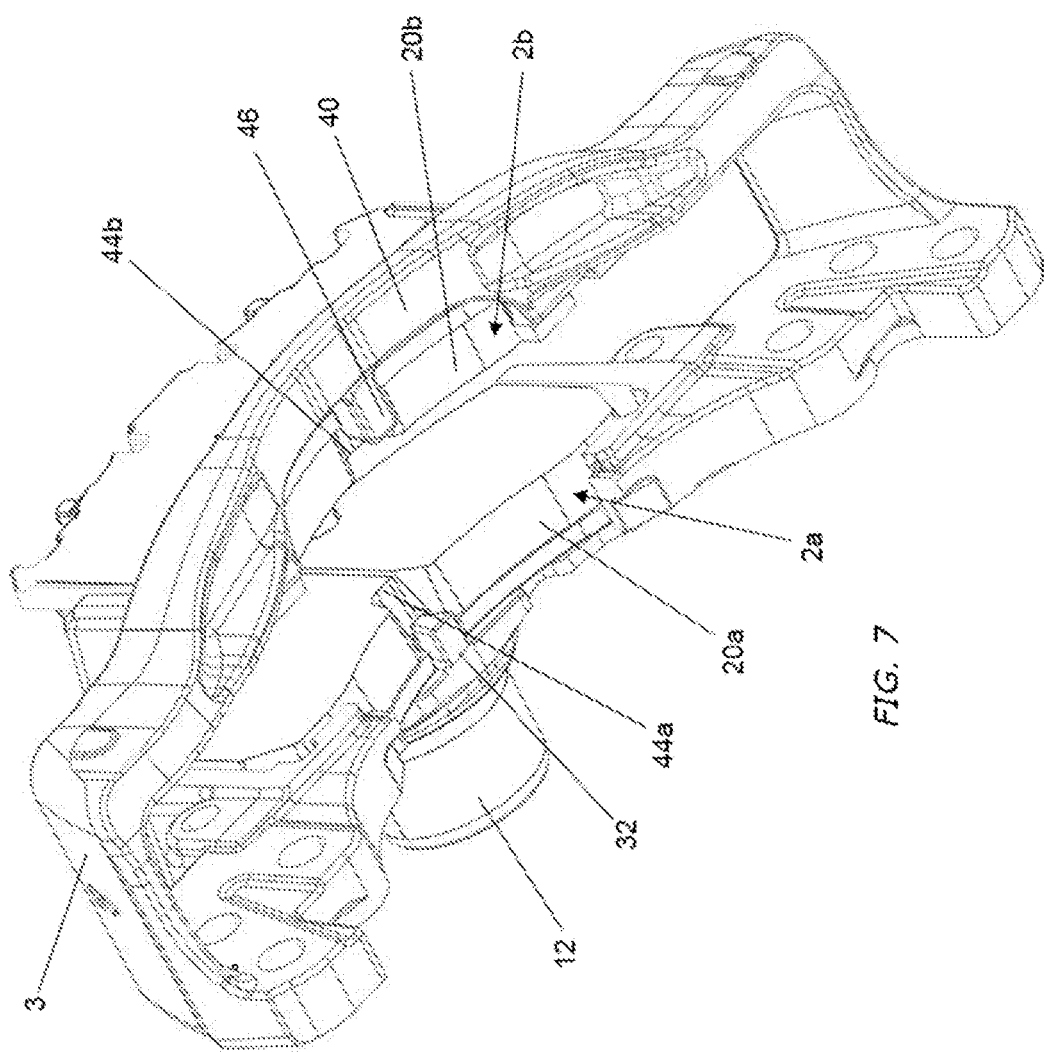
FIG. 7 is an isometric view showing the underside of a carrier, piston, and spreader plate, with brake pads in place, of the brake of FIG. 1.
Figure 8:
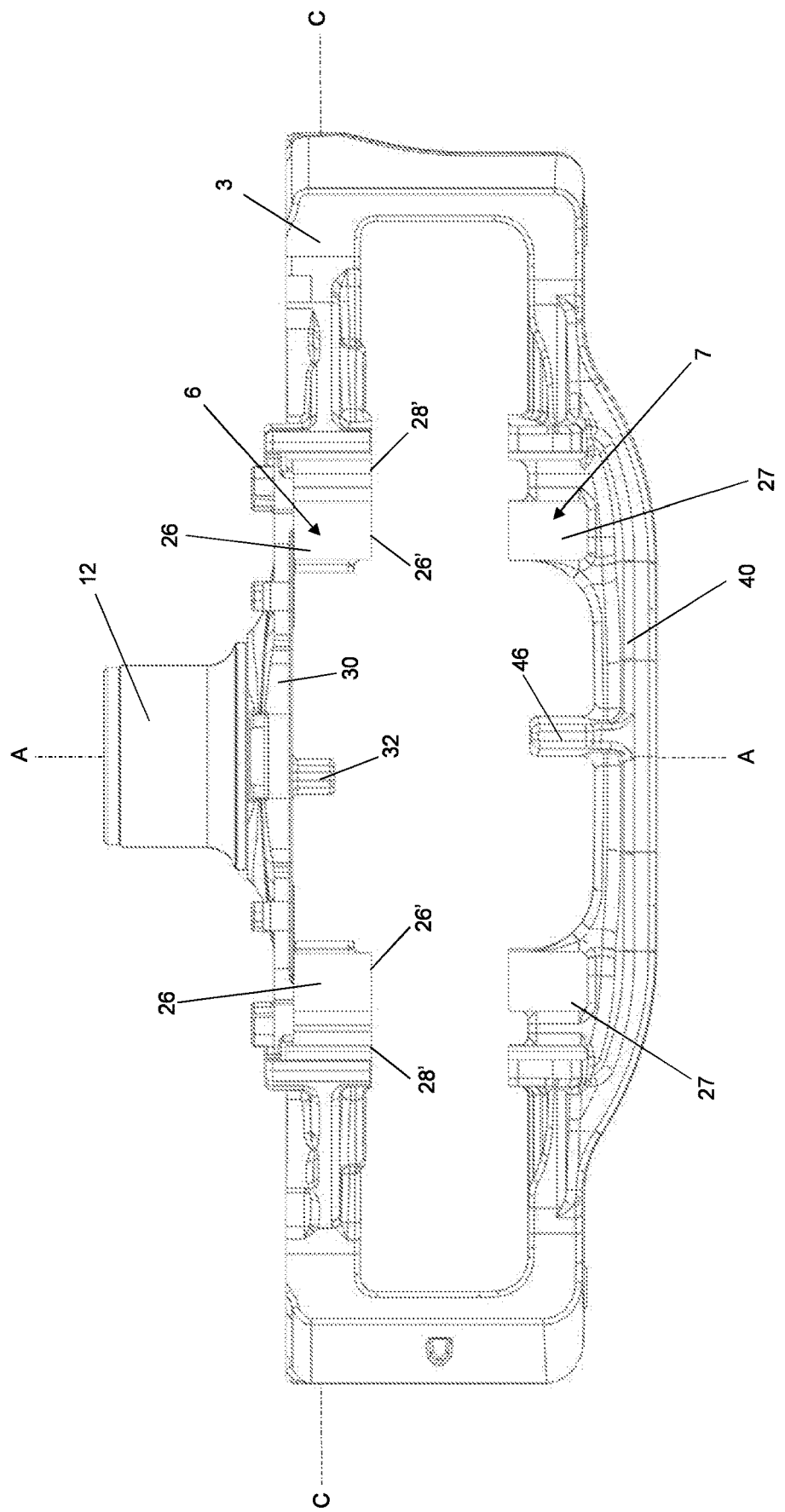
FIG. 8 is a plan view of a carrier, piston, and spreader plate, with no brake pads in place, of the brake of FIG. 1.

An actuation mechanism of the brake 1 is indicated generally at 5 in FIGS. 1 and 2 and of any suitable type known in the art. The actuation mechanism 5 is mounted within a housing 9 of the caliper 10. The housing 9 is adapted to mount a conventional air or other power actuator—e.g., an electromechanical actuator (not shown) on an external face thereof. An actuating lever (not shown) may perform an angular reciprocal swinging movement under the action of a thrust member of the power actuator, the lever being integral or attached to a rotary actuating member (commonly referred to as an operating shaft) which is rotatably supported within the caliper. The operating shaft pivots on cylindrical rollers, the longitudinal axes of which are offset from the rotary axis of the operating shaft and form an eccentric actuating arrangement. A curved outboard surface of the operating shaft bears against a yoke member, which is arranged such that it can linearly actuate to engage a thrust assembly, in this case an adjustable single tappet assembly. FIGS. 5 and 6 show a portion of the tappet assembly, an outer piston portion 12, which has a threaded inner surface, which enables the tappet to be extended when required, to close the distance between the brake pads 2a, 2b and the rotor 4 and thereby maintain a suitable running clearance between the brake pads and rotor as friction material of the brake pads wears.

In this embodiment, the outer portion 12 is integral with a spreader plate 30, i.e., the outer piston and spreader plate 30 are monolithically cast as a single component. The spreader plate 30 engages the backplate 22a of the inboard brake pad 2a, as well as machined radial and circumferential abutment surfaces 28, 26 of the carrier 3 (seen most clearly in FIG. 4 and described in more detail below). Therefore, the interaction of the spreader plate 30 and carrier 3 prevent rotation of the outer piston 12 in use, and the spreader plate 30 is guided by the carrier 3 during a brake actuation operation.

In this embodiment, the spreader plate 30 is generally rectangular and generally planar, with a greater surface area than the cross-sectional area of the outer piston portion 12. The spreader plate 30 has circumferential, radially inner and radially outer edges. Each circumferential edge includes an extending portion that has a circumferential engagement surface 37 for engaging the circumferential carrier abutments 28. The radially inner edge includes two extending portions adjacent the circumferential edges. Each extending portion has a radial engagement surface 38 for engaging the radial abutments 26. Typically, the circumferential and radial engagements surfaces 37, 38 are machined, such that the spreader plate 30 can slide on these surfaces relative to the carrier 3. As the circumferential and radial engagements surfaces 37, 38 are only provided on relatively small extending portions of the spreader plate 30, the total area that needs to be machined can remain low, keeping manufacturing costs as minimal as possible. The radially inner edge of the spreader plate 30 also includes two semi-circular cut-outs 35. These cut-outs 35 enable access for bolts, to secure a cover plate to the housing 9 of the caliper, to help seal the internal components of the brake.

The main function of the spreader plate 30 is to spread the load applied by the single piston across the circumferential width of the inboard pad 2a, which is particularly useful for high pressure applications (e.g., stopping a vehicle at high speed), to more evenly distribute the load applied to the pads, and help prevent brake fade. There is also an effect on wear; i.e., wear closer to the center of the pad (where the piston is applied) can be reduced, to provide a more even distribution of wear.

In this embodiment, the spreader plate 30 has two bores 34, surrounded by raised portions 36. The bores 34 and raised portions 36 are arranged to be adjacent the circumferential edges of the spreader plate 30. The bores 34 have the function of providing access to a cover plate of the brake so it can be bolted to the housing 9 of the caliper, to help seal the internal components of the brake 1. The raised portions 36 project in an outboard direction to act as pad contact surfaces, for the inboard pad 2a. The recessed remaining outboard surface (in line with the piston) of the spreader plate 30 is intended to be for emergency braking only. In other words, in normal operation only the raised portions 36 are in contact with the brake pad 2a, but in an emergency braking operation the brake pad 2a will flex to a limited degree and contact will also occur in the center of the spreader plate 30, to help provide a stronger braking force.

As described in more detail below, the spreader plate 30 also has a formation that helps to foolproof the fitting of the brake pads, i.e., prevent the inboard brake pad 2a from being fitted with its friction material 20a facing away from the rotor 4.

To actuate the brake 1, rotation of the lever and the connected operating shaft causes actuating thrust to be applied parallel to axis A-A via the tappet assembly to the spreader plate 30. This spreads the load across the backplate 22a of the brake pad 2a (i.e., so it is directly actuated) and, by reaction via the caliper 10, to the outboard brake pad 2b (which is indirectly actuated). The brake pads 2a, 2b are mounted so as to face respective sides of the rotor 4. The carrier 3 restrains the brake pads from circumferential movement indirection C and radial inward movement along axis R. Radial movement outward along axis R is restricted by pad springs 14 and a pad retainer 16. As can be seen most clearly from FIG. 2, the caliper 10 has an aperture 18, through which the brake pads 2a, 2b can be inserted and removed in the radial direction R. This enables the brake pads 2a, 2b to be inserted and removed even while the brake 1 is still installed on a wheel, i.e., the rotor 4 is still in place.

An adjuster assembly is located within the housing 9 and may be of any appropriate conventional type needing no detailed description. The adjuster responds to excessive movement of the inboard brake pad 2a (e.g., due to wear of the friction material 20a, 20b of the brake pads 2a, 2b, and/or wear of the rotor 4 in use—described in more detail below) and produces resultant rotation of an inner piston 13 relative to the outer piston 12 (which is restricted from rotation by the engagement with the carrier 3), to extend the tappet assembly and move the brake pads 2a, 2b closer to the rotor. Other force transmission devices are known, but operate using similar principles, and the present invention remains applicable thereto. Certain known force transmission devices use a double tappet assembly, rather than a single tappet assembly, and could also be used with the present invention.

In this embodiment, the inboard and outboard brake pads 2a, 2b are substantially similar. Each brake pad 2a, 2b comprises a substantially planar cast iron backplate 22a, 22b of a generally rectangular shape and having a typical thickness of around 9-10 mm. In other embodiments stamped steel backplates having a typical thickness of around 6 mm (e.g., 5-8 mm) may instead be used. In other embodiments, even thinner backplates may be used (e.g., 2-3 mm). The backplates 22a, 22b have suitable pad spring holding formations 24 for fixing the pad springs 14 thereto. In this embodiment, the spreader plate 30 also has pad spring holding formations 24. In alternative embodiments (not shown), the pad springs may be fixed to the pad retainer instead.

The friction material 20a, 20b is fixed to the pads 2a, 2b using a suitable mechanical keying arrangement. The friction material typically has a thickness of around 15-20 mm initially, and the pad is typically considered fully worn and in need of replacement when only 2 mm of material remains (although this minimum threshold cannot always be guaranteed to be followed in the field).

In this embodiment a radially extending channel extends through a portion of the depth friction material 20a, 20b at the center of the friction material (see FIGS. 3 and 5). Such channels are typically provided to inhibit unwanted cracking of the friction material occurring, caused by temperature or load stresses in use. In other embodiments pads with no such channels, or two or more channels in other locations, may be provided.

With reference to FIG. 4 (where the brake pads 2a, 2b are not shown, for clarity), as the friction material 20a, 20b of the brake pads wears and the adjuster assembly extends the tappet assembly to maintain a suitable running clearance (typically 0.5 mm between each pad 2a, 2b and the rotor 4) the inboard pad 2a moves outboard along radial inboard abutment surfaces 26 and circumferential inboard abutment surfaces 26. Assuming equal friction material 20a, 20b wear on the inboard and outboard pads 2a, 2b, and inboard and outboard faces of the rotor 4, the inboard pad 2a moves outboard on the radial 29 and circumferential 27 abutment surfaces at a distance equal to the distance the outboard pad 2b moves inboard. However, the tappet assembly must extend twice this distance, to account for the wear of both pads 2a, 2b.

In addition, the brake rotor 4 wears, albeit at a slower rate, and may be considered fully worn once 3 mm is lost from each face.

As the tappet assembly extends, the spreader plate 30 (which engages the inboard radial and circumferential surfaces 28, 26) moves over the inboard brake pad window 6. In addition, wear causes the caliper 10 to move inboard with respect to the carrier 3 and therefore clearance in a radial direction R between an outboard portion of the caliper 10 and an outboard carrier beam 40 is required.

Looking particularly at FIGS. 4, 6, 7 and 8, the construction of the carrier 3 is generally of a similar format to known carriers, but with some important differences in accordance with the present invention. In this embodiment the carrier is cast as a single iron or steel component. In other embodiments, it may be formed from two or more components, one or more of which may be forged.

In this embodiment, there is no inboard carrier beam extending between the circumferential abutments 26. Instead, there is an air gap 42 in the circumferential direction C between the circumferential abutments 26. This air gap 42 enables the carrier to be produced at a reduced manufacturing cost, as less material is required, and also results in a lighter brake. The majority of the drag load from the inboard brake pad 2a is taken by the axle mounting bracket/steering knuckle (not shown) to which the carrier is secured. The air gap may also permit greater freedom during installation, as there is a reduced risk of components clashing.

In contrast, in this embodiment, on the outboard side, there is a carrier beam 40. As can be seen most clearly from FIGS. 4 and 8, the outboard carrier beam 40 bows outboard on axis A-A and radially outwards. A large amount of strength is required by the outboard beam 40 to withstand the drag loads generated by the outboard brake pad 2b, and the outboard bowed shape has been found to provide an optimized strength to weight ratio.

The radial abutment surfaces 28, 29 are located proximate the circumferential surfaces 26, 27, but spaced therefrom. The radial and circumferential abutment surfaces 28, 29, 26, 27 are cast with additional material and subsequently machined to provide suitably smooth and accurately dimensioned surfaces. In addition, the surfaces may be treated (e.g., induction hardened) for additional durability.

In this embodiment, faces 28', 29', 26', 27' of the abutment surfaces that face the rotor (i.e., are generally parallel to axis R) are also machined in order to obtain a close enough tolerance to enable there to be a nominal clearance of approximately 1.5 mm between an unworn rotor and the faces 28', 29', 26', 27' either side of the rotor.

As such, even, for example, if the rotor is in a fully worn condition (3 mm lost from each face), a 6 mm steel backplate is used, and the pad is worn until no friction lining remains, a 1.5 mm overlap exists between the pad and abutment surfaces, so the pad 2 is not ejected through the gap between rotor 4 and carrier 3. Of course, if it could be ensured that only thicker cast backplates are used, a greater clearance— e.g., 3 mm may be provided, and in this instance there may be no need to machine the facing surfaces, since this allows for the greater tolerances inherent with cast components.

With reference to FIGS. 3 to 8, in order to "foolproof" the fitment of the brake pads 2a, 2b, so they can only be fitted radially inwardly into the inboard and outboard windows 6 and 7 in the correct orientation (i.e., with the friction material 20a, 20b facing the rotor 4) during an assembly or maintenance operation, and the brake then fully assembled by securing the pads in place with the pad retainer in both unworn and worn conditions, each pad 2a, 2b comprises a formation, in this embodiment, in the form of a recess 44a, 44b in a radially inner edge that extends through both the friction material 20a, 20b and backplate 22a, 22b. Complementary formations are provided in the brake in inboard and outboard locations. In this embodiment, the inboard and outboard formations are in the form of projections 32 and 46. The formations on the brake pads 2a, 2b are provided in locations that correspond to the locations of the inboard and outboard projections 32, 46.

In this embodiment, the inboard projection 32 is cast integrally with the spreader plate 30 and in this embodiment is a trapezoid with rounded corners and is of substantially constant cross-section in the A-A axis. The projection extends in an outboard direction from an outboard surface of the spreader plate 30.

The inboard projection 32 is located adjacent the radially inner edge of the outboard surface of the spreader plate 30. It extends in a radial direction. In this embodiment, the projection 32 extends radially less than 25% of the height of the brake pad. This helps to maximize the area of the spreader plate that can engage the inboard brake pad 2a and backplate 22a. It also helps to minimize the amount of friction material that must be sacrificed to create the corresponding first recess on the first brake pad.

The 'trapezoid' shape means that the widest point of the projection 32 in a circumferential direction is adjacent the radially inner edge of the spreader plate 30, and the narrowest point is remote from the radially inner edge of the spreader plate 30. This tapering enables the formation 32 to act as a guide and makes it easier for an installer to locate the inboard pad when installing in a radial direction.

In this embodiment the projection 32 is located proximate the center of the spreader plate 30 (where a plane defined by axes R and A intersects the spreader plate 30 at 90°) but is offset slightly to the left as viewed in FIG. 4.

The outboard projection 46 is of substantially identical cross-section to the inboard projection 32 and extends in an inboard direction from the outboard beam 40 and terminates before it reaches the plane defined by the faces 27', 29' of the outboard radial and circumferential abutment surfaces 29, 27. In other embodiments, the projection could terminate level with the faces 27', 29' (i.e., to also have a nominal 1.5 mm clearance from the outboard face of rotor 4), and could be machined in a similar operation. As the outboard beam 40 bows outboard, the distance the projection 46 extends inboard along axis A-A is greater than the distance projection 32 extends outboard. This accounts for the fact that the outboard pad 2b slides with respect to the carrier 3 whereas the inboard pad has a fixed relationship with respect to the spreader plate 30. In this embodiment, the outboard projection length is 18.5 mm, and the inboard projection length is 12 mm, but it will be appreciated that these lengths can vary depending on the application. For example, the length can vary depending on the thickness of the backplate, the thickness of the friction material and the defined wear allowance of the friction material and rotor.

On the inboard side, as the location of the inboard pad 2a will be fixed relative to the position of the spreader plate 30, it is important that the projection length is controlled to help ensure that, as the friction material wears, the projection 32 does not come into contact with the rotor 4. A fully worn pad will have a particular amount of friction material remaining (e.g., 2 mm). The projection should never protrude in an outboard direction beyond this friction material. In other words, the projection should not extend further than an axial distance defined by a combination of the backplate of the pad and an amount of friction material equal to that of a fully worn brake pad. In practice, this exact length can vary, but a person skilled in the art will be able to calculate the appropriate length depending on the application. In this embodiment, when the pad 2a is seated in the window 6, the projection 32 does not extend further than the backplate 22a of the pad 2a along axis A-A, i.e., the projection 32 is arranged to not extend into the friction material 20a of the inboard pad 2a at all. This helps to ensure that, even as the friction material 20a is worn during brake use, the projection 32 would still not come into contact with the rotor 4. This will not be an issue for the outboard projection 46, as it will remain in a fixed axial location, as the outboard brake pad 2b slides in an inboard direction relative to the fixed projection 46, as the brake is adjusted.

The outboard projection 46 is proximate the center of beam 40 but is offset to the right by the same amount inboard projection 32 is offset to the left.

In other words, the projections 32 and 46 have rotational symmetry about axis R, but do not have mirror symmetry about a plane defined by R and direction C.

The height of the projections 32, 46 is typically limited by the clearance between the outboard beam 40 and the caliper 10 so the caliper 10 can move over the beam 40 when the pads 2a, 2b become worn.

In this embodiment, the brake pads 2a, 2b are identical, and the recesses 44a, 44b therein are essentially the same shape as the projections 32 and 46, but larger in both width and height to provide sufficient clearance that in normal usage the projections do not contact the pads 2a, 2b and therefore interfere with normal operation thereof. In this embodiment, the clearance is around 3.5 mm in order to account for clearance circumferentially of the pads 2a, 2b within windows 6 and 7, tolerances in the backplates 22a, 22b and projections 32, 46, and heat expansion etc.

As the friction material 20a, 20b is set back from the perimeter of the backplate 22a, 22b by approx. 0.5 mm, the recess in the friction material is slightly larger than in the backplate.

As the recesses 44a, 44b are somewhat larger than the projections 32, 46, it can be seen that in this embodiment they cross the center of the pad (i.e., cross a plane defined by axes R and A). This has a number of benefits for the pad. Firstly, the impact of the recess on the swept pad area is minimized, as a portion of the area removed falls within the channel. Specifically, as friction material is removed on one side of the brake pad to form the recesses 44a, 44b, there is a risk of uneven wear, as the side with the majority of the recess will have a lower overall area of friction material than the other side. However, ensuring the recesses 44a, 44b are close to the center of the pad will help to minimize the risk of removing friction material causing uneven wear, as this reduces the scope for uneven distribution of the applied braking forces across the friction material 20a, 20b of the brake pads 2a, 2b.

Further, it avoids there being a relatively thin and therefore weak portion of friction material being left between the channel and the recess 44a, 44b, which could be broken off in service, reducing the swept pad area. Additionally, the projections are located in a relatively low stress area of the carrier 3, and spreader plate 30.

In embodiments with a single tappet assembly, theoretically, it is possible to move the recesses 44a, 44b and projections 32, 46 further away from the center of the pads 2a, 2b, as there is no limitation by the position of the tappet heads, as there would be in a double tappet assembly, for example. However, as stated above, the central position does have advantages, and it is also the case that the brake pads 2a, 2b manufactured for use in the current brake 1 would still function in older brake designs, this backwards compatibility being advantageous for manufacturing reasons. Further, moving the location of the recesses 44a, 44b and projections 32, 46 might make access difficult, to install the bolts for securing the cover plate to the housing 9.

If one of the pads 2a, 2b was placed into a window 6, 7 with the backplate 22a, 22b facing the rotor 4, and successfully fitted in this orientation, this incorrect fitting would significantly impair the ability of brake to stop the vehicle to which it is fitted. However, with the current foolproofing arrangement, even with fully worn brake pads 2a, 2b (2 mm of friction material remaining) and a fully worn rotor 4 (3 mm wear to each face), the projections 32, 46 would not locate within the recesses 44a, 44b, and there would be sufficient overlap between the backplates 22a, 22b and the projections 32, 46 for the projection to prevent the backplates 22a, 22b from being able to seat on the radial abutment surfaces 28, 29. This would cause the pads 2a, 2b to be in a radially elevated position of around 8 mm. In this case, the pad retainer 16, which hooks into a recess on the housing 9 of the caliper 10, would be tilted outwardly to the extent that even with the pad springs 14 depressed, a pad retainer bolt 17 would be unable to engage with a complementary threaded bore in the caliper 10. As a result, re-assembly would be prevented. The brake fitter would also be alerted to their error and would be able to correct it.

It is possible to circumvent the foolproofing for substantially worn pads by fully winding back the tappet, i.e., to create the maximum distance between the spreader plate 30 and the rotor 4. However, this is unlikely to be a problem as, in practice, part-worn pads would only be removed for inspection before being replaced again almost immediately (assuming the pad does not need replacing). In this case, there would be no reason for a fitter to de-adjust the tappet.

It will be appreciated that numerous other recess shapes for the pads 2a, 2b may be utilized, and that through careful selection thereof, they may be used not only for foolproofing, but also to ensure that pads of a particular specification for one brake model are not useable on other models for which they are not intended.

It will be appreciated that the dimensions referred to above are used for illustrative purposes, and will vary dependent upon the size and geometry of the brake to which the present invention is applied. The term "fully worn pad" is intended to refer to a pad which has reached its minimum design limit for the amount of friction material remaining thereon—i.e., in the specific embodiment above, 2 mm of friction material. The term "excessively worn pad" is intended to mean a pad that has less than the minimum design limit of friction material remaining—e.g., 1 mm or 0.5 mm. For other models of disc brake, this thickness may differ, but would be stipulated in service manuals and/or the point at which a wear indicator shows that the brake pads require changing.

Numerous benefits of the present invention are achieved with brake pads that do not utilize a central channel, and with recesses located elsewhere.

Although the invention has been described above with reference to one or more preferred embodiments, it will be appreciated that various changes or modifications may be made without departing from the scope of the invention as defined in the appended claims. For example, similar principles may be applied to arrangements that have neither rotational nor mirror symmetry—e.g., to prevent pads being fitted in the wrong orientation as well as the wrong location. An example of this may be where pads inboard and outboard have different strengths or other dissimilar properties, and it would be detrimental to brake operation for the inboard pad to be fitted outboard and/or vice versa. The projections 32, 46 and the corresponding recesses 44a, 44b could be offset by different amounts from the center line of the brake. In this case, the inboard and outboard pads 2a, 2b would not be identical. This would prevent the pads from being fitted in the wrong inboard/outboard position as well as from being incorrectly fitted with the friction material facing the rotor.

The faces of the projections that are adjacent the rotor faces may have a greater clearance if used only with thicker cast backplate brake pads—e.g., around 3 mm. In this embodiment, machining of the faces may not be required.

In an alternative embodiment (not shown), the outboard radial and circumferential abutment surfaces 29, 27 could be provided on the caliper 10 of the brake 1 instead of the carrier 3, such that the outboard pad 2b would be supported directly on the caliper 10 instead of by the carrier 3. In this case, the foolproofing function could be maintained by providing the outboard formation on an outboard beam of the caliper 10.

In a further alternative embodiment (not shown), the inboard radial and circumferential abutment surfaces 28, 26 could be provided on the spreader plate 30 of the brake 1 instead of the carrier 3, such that the inboard pad 2a would be directly supported on the spreader plate 30 instead of by the carrier 3. The inboard formation 32 would, in this case, still be provided on the spreader plate 30.

The inboard and outboard formations are described above as projections 32, 46, with the corresponding formations on the brake pads 2a, 2b being recesses 44a, 44b. However, in an alternative embodiment, for example, the inboard formation could be a recess, and the formation on the first brake pad could be a projection extending in an axially inboard direction. In this case, the projection would typically be provided in a location adjacent a radially outer edge of the first brake pad, so the brake pad can still be installed radially, but will be blocked from being installed with the friction material facing the rotor, as the projection would collide with the rotor in this orientation. It may also be technically feasible for a recess to be provided in the outboard location, to interact with a radially outboard extending projection of the second brake pad.

In yet another further alternative embodiment, the spreader plate 30 may be arranged such that it does not engage the inboard radial and circumferential abutment surfaces of the carrier 3. In this arrangement, the inboard projection 32 could act as an anti-rotation feature, with the interaction between the projection 32 and the inboard pad 2a preventing rotation of the outer piston 12, as well as providing the foolproofing functionality.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake comprising:
   an actuation mechanism that includes a tappet, the tappet having a first formation;
   a disc brake rotor arranged to rotate about a rotational axis;
   first and second mounting structures to be located in use adjacent opposing inboard and outboard faces, respectively, of the disc brake rotor, the second mounting structure having a second formation;
   first and second brake pads located by the first and second mounting structures, respectively, such that upon application of the actuation mechanism the first and second brake pads clamp the disc brake rotor and brake torque is reacted by the first and second mounting structures;
   wherein the first brake pad has a corresponding first formation for interacting with the first formation of the tappet, and the second brake pad has a corresponding second formation for interacting with the second formation of the second mounting structure, wherein (i) the first formation of the tappet and the second formation of the second mounting structure and (ii) the first formation of the first brake pad and the second formation of the second mounting structure do not have mirror symmetry about a plane defined by a center of the disc brake rotor, a radial axis, and a circumferential direction normal to both the rotational axis of the disc brake rotor and radial axis, and wherein to prevent or inhibit fitting of the first and second brake pads individually or in combination with friction material facing away from the disc brake rotor, the first formation of the tappet must interact with the corresponding first formation of the first brake pad for the first brake pad to be fitted in the first mounting structure, and the second formation of the second mounting structure must interact with the corresponding second formation of the second brake pad for the second brake pad to be fitted in the second mounting structure, wherein the tappet has an axially outboard surface that faces toward and engages the first brake pad and a perimeter that extends from the axially outboard surface and that extends continuously around the axially outboard surface such that the first formation of the tappet extends from the axially outboard surface and from the perimeter.

2. The disc brake of claim 1 wherein the tappet comprises a piston and a spreader plate, the first formation of the tappet being located on the spreader plate, and the piston and spreader plate being integrally and monolithically formed from the same piece of material.

3. The disc brake of claim 1 wherein:
the first formation of the tappet is a first projection extending in an axially outboard direction from the tappet;
the second formation of the second mounting structure is a second projection;
the corresponding first formation of the first brake pad is a first corresponding recess for locating the first projection of the tappet; and
the corresponding second formation of the second brake pad is a second corresponding recess for locating the second projection of the second mounting structure.

4. The disc brake of claim 3 wherein the first projection is located adjacent a radially inner edge of the axially outboard surface of the tappet.

5. The disc brake of claim 4 wherein the first projection extends radially less than 25 percent of a height of the first brake pad.

6. The disc brake of claim 4 wherein the first projection has a width in the circumferential direction and tapers in a radial direction such that the widest point is adjacent the radially inner edge of the axially outboard surface of the tappet and the narrowest point is remote from the radially inner edge of the axially outboard surface of the tappet.

7. The disc brake of claim 3 wherein the first projection extends in the axially outboard direction to a distance such that, when the first brake pad is in place, the first projection does not extend further than a distance defined by a combination of a backplate of the first brake pad and an amount of friction material equal to that of a fully worn pad.

8. The disc brake of claim 7 wherein the first projection does not extend beyond the backplate of the first brake pad.

9. The disc brake of claim 1 wherein the first formation is located closer to a circumferential center of the tappet than a circumferential edge of the tappet.

10. The disc brake of claim 1 wherein the first mounting structure is a brake carrier, wherein the first brake pad locates on circumferential carrier abutments and there is an air gap between the circumferential carrier abutments.

11. The disc brake of claim 1 wherein the tappet includes a spreader plate and the first mounting structure is the spreader plate.

12. The disc brake of claim 1 wherein the disc brake has a single tappet actuation mechanism.

13. The disc brake of claim 1 wherein the second mounting structure is a brake carrier and the second brake pad locates on carrier abutments located on an outboard beam of the brake carrier.

14. The disc brake of claim 13 wherein the outboard beam bows in an outboard direction, and the second formation of the second mounting structure is a projection that extends axially inboard such that it is substantially level with the carrier abutments.

15. The disc brake of claim 1 wherein the second mounting structure is a caliper and the second brake pad locates on carrier abutments located on an outboard portion of the caliper.

16. The disc brake of claim 1 wherein the first and second formations do not have rotational symmetry about an axis extending radially from a central position between the first and second mounting structures.

17. The disc brake of claim 1 further comprising an aperture for fitting and removal of the first and second brake pads in a radial direction, wherein the aperture permits the fitting and removal of the first and second brake pads to be achieved with the disc brake rotor being in place.

18. The disc brake of claim 17 wherein the first and second brake pads are configured to be retained radially in the first and second mounting structures by a pad retainer, wherein the pad retainer is prevented from being secured over the first and second brake pads if at least one of the first and second brake pads is incorrectly orientated.

19. A disc brake comprising:
an actuation mechanism that includes a tappet, the tappet having a first formation;
a disc brake rotor arranged to rotate about a rotational axis;
first and second mounting structures to be located in use adjacent opposing inboard and outboard faces, respectively, of the disc brake rotor, the second mounting structure having a second formation;
first and second brake pads located by the first and second mounting structures, respectively, such that upon application of the actuation mechanism the first and second brake pads clamp the disc brake rotor and brake torque is reacted by the first and second mounting structures;
wherein the first brake pad has a corresponding first formation for interacting with the first formation of the tappet, and the second brake pad has a corresponding second formation for interacting with the second formation of the second mounting structure,
wherein (i) the first formation of the tappet and the second formation of the second mounting structure and (ii) the first formation of the first brake pad and the second formation of the second mounting structure do not have mirror symmetry about a plane defined by a center of the disc brake rotor, a radial axis, and a circumferential direction normal to both the rotational axis of the disc brake rotor and radial axis, and
wherein to prevent or inhibit fitting of the first and second brake pads individually or in combination with friction material facing away from the disc brake rotor, the first formation of the tappet must interact with the corresponding first formation of the first brake pad for the first brake pad to be fitted in the first mounting structure, and the second formation of the second mounting structure must interact with the corresponding second formation of the second brake pad for the second brake pad to be fitted in the second mounting structure, wherein the tappet has an axially outboard surface that faces toward and engages the first brake pad and a perimeter that extends from the axially outboard surface and that extends continuously around the axially outboard surface, the perimeter having a radially inner edge that faces toward an axis of rotation of a brake rotor such that the first formation of the tappet extends from the axially outboard surface and from the radially inner edge;

wherein the first formation of the tappet is a first projection extending in an axially outboard direction from the tappet, the second formation of the second mounting structure is a second projection, the corresponding first formation of the first brake pad is a first corresponding recess for locating the first projection of the tappet, and the corresponding second formation of the second brake pad is a second corresponding recess for locating the second projection of the second mounting structure.

20. The disc brake of claim 19 wherein the first formation is positioned between first and second semi-circular cut-outs in the tappet that extend from the radially inner edge.

21. A disc brake comprising:
an actuation mechanism that includes a tappet, the tappet having a first formation;
a disc brake rotor arranged to rotate about a rotational axis;
first and second mounting structures to be located in use adjacent opposing inboard and outboard faces, respectively, of the disc brake rotor, the second mounting structure having a second formation;
first and second brake pads located by the first and second mounting structures, respectively, such that upon application of the actuation mechanism the first and second brake pads clamp the disc brake rotor and brake torque is reacted by the first and second mounting structures;
wherein the first brake pad has a corresponding first formation for interacting with the first formation of the tappet, and the second brake pad has a corresponding second formation for interacting with the second formation of the second mounting structure, the first formation being positioned between semi-circular cut-outs in the tappet,
wherein (i) the first formation of the tappet and the second formation of the second mounting structure and (ii) the first formation of the first brake pad and the second formation of the second mounting structure do not have mirror symmetry about a plane defined by a center of the disc brake rotor, a radial axis, and a circumferential direction normal to both the rotational axis of the disc brake rotor and radial axis, and
wherein to prevent or inhibit fitting of the first and second brake pads individually or in combination with friction material facing away from the disc brake rotor, the first formation of the tappet must interact with the corresponding first formation of the first brake pad for the first brake pad to be fitted in the first mounting structure, and the second formation of the second mounting structure must interact with the corresponding second formation of the second brake pad for the second brake pad to be fitted in the second mounting structure.

22. The disc brake of claim 21 wherein the first formation has a trapezoidal shape.

* * * * *